(12) United States Patent
Joshi et al.

(10) Patent No.: US 7,327,694 B2
(45) Date of Patent: Feb. 5, 2008

(54) ADAPTIVE RADIO LINK PROTOCOL (RLP) TO IMPROVE PERFORMANCE OF TCP IN WIRELESS ENVIRONMENT FOR CDMAONE AND CDMA2000 SYSTEMS

(75) Inventors: Atul Suresh Joshi, Maharashtra (IN); Anoop R. Kulkarni, Karnataka (IN)

(73) Assignee: Sasken Communication Technologies Ltd., Bangalore (IN)

( * ) Notice: Subject to any disclaimer, the term of this patent is extended or adjusted under 35 U.S.C. 154(b) by 970 days.

(21) Appl. No.: 10/209,314

(22) Filed: Jul. 31, 2002

(65) Prior Publication Data

US 2003/0103483 A1 Jun. 5, 2003

(51) Int. Cl.
*H04Q 7/24* (2006.01)

(52) U.S. Cl. .................. 370/253; 370/338; 370/342; 714/748

(58) Field of Classification Search ........... 370/335, 370/338, 342, 349, 253, 394, 395.42; 714/748, 714/749
See application file for complete search history.

(56) References Cited

U.S. PATENT DOCUMENTS

| | | | | |
|---|---|---|---|---|
| 5,065,398 A * | 11/1991 | Takashima | ............. | 370/230 |
| 5,708,656 A * | 1/1998 | Noneman et al. | ............. | 370/335 |
| 6,011,796 A * | 1/2000 | Rezaiifar et al. | ............. | 370/394 |
| 6,076,181 A * | 6/2000 | Cheng | ............. | 714/748 |
| 6,169,732 B1 * | 1/2001 | Hetherington et al. | ............. | 370/335 |
| 6,314,101 B1 * | 11/2001 | Rezaiifar et al. | ............. | 370/394 |
| 6,335,933 B1 * | 1/2002 | Mallory | ............. | 370/394 |
| 6,359,877 B1 * | 3/2002 | Rathonyi et al. | ............. | 370/349 |
| 6,493,316 B1 * | 12/2002 | Chapman et al. | ............. | 370/231 |
| 6,567,388 B1 * | 5/2003 | Tomcik et al. | ............. | 370/335 |
| 6,581,176 B1 * | 6/2003 | Seo | ............. | 714/749 |
| 6,718,500 B1 * | 4/2004 | Lee et al. | ............. | 714/749 |
| 6,735,649 B2 * | 5/2004 | Williams et al. | ............. | 710/65 |
| 6,977,888 B1 * | 12/2005 | Frenger et al. | ............. | 370/218 |
| 7,099,298 B2 * | 8/2006 | Kim | ............. | 370/342 |
| 7,123,617 B1 * | 10/2006 | Abrol | ............. | 370/394 |
| 7,236,494 B2 * | 6/2007 | Mallory | ............. | 370/394 |

OTHER PUBLICATIONS

Umesh, M.N., Joshi, A.S., Kumar, A, amd Mukhopadhay, T, "A NAK based hybrid type II ARQ scheme for cdmaOne/cdma2000 systems", Vehicular Technology Conference, 1999, VTC 1999, Sep. 19-22, 1999, p. 2596-2600 vol. 5.*

Balakrishnan et al., "The effects of asymmetry on TCP performance", Mobile Networks and Applications, 1999, p. 219-241.*

* cited by examiner

*Primary Examiner*—Hassan Kizou
*Assistant Examiner*—Brian T O'Connor
(74) *Attorney, Agent, or Firm*—Welsh & Katz, Ltd.

(57) ABSTRACT

A system for transmitting data is provided. The system includes a first station having a processor to format source data into data frames and idle frames, and a module to transmit the data and idle frames. A second station is in communication with the first station and has a module to receive the data frames and idle frames and a processor configured to detect an absence of an expected data frame, transmit a plurality of repeat negative acknowledgements if the absent expected data frame is not received, transmit a negative acknowledgement corresponding to the absent expected data frame, determine whether a rate of idle frames exceeds a predetermined threshold and reduce transmission of repeat negative acknowledgements when the rate of idle frames does not exceed the predetermined threshold. The first station may be a base station and the second station may be a mobile station.

7 Claims, 6 Drawing Sheets

TIA/EIA/IS-707 Simplified Protocol Stack

Figure 4: TIA/EIA/IS-707 Protocol Stack

Figure 5: TIA/EIA/IS-707 Simplified Protocol Stack

Figure 6: Simulation Setup

Figure 7: Retransmission performance of various schemes with Maximum TCP Window size = 4MSS Figure 8: Performance of various schemes with Maximum TCP Window size = 4MSS Figure 9: Retransmission performance of various schemes with Maximum TCP Window size = 2MSS Figure 10: Performance of various schemes with Maximum TCP Window size = 2MSS

ADAPTIVE RADIO LINK PROTOCOL (RLP) TO IMPROVE PERFORMANCE OF TCP IN WIRELESS ENVIRONMENT FOR CDMAONE AND CDMA2000 SYSTEMS

FIELD OF THE INVENTION

The invention pertains generally to mobile and base stations for wireless networks, and, in particular, to mobile and base stations that run TCP/IP applications on wireless networks. The invention also relates to an improved Acknowledgment Request (ARQ) method at RLP layers.

BACKGROUND OF THE INVENTION

The TCP (Transmission Control Protocol) has often been used as the transport protocol for a wide variety of data services. The TCP performs well in traditional networks based on wire line links because of the TCP's efficient congestion control schemes, and because of the low packet loss probability (approximately <0.001) associated with traditional networks. However, the TCP performs poorly over the wireless link because of the high bit error rates associated with wireless links. The TCP slows data transmission, lowering throughput, when packets are lost because the TCP assumes that any packet loss results from congestion. This characteristic is a likely cause of the TCP's poor performance over the wireless link.

A Radio Link Protocol (RLP) has been used in conjunction with the TCP to address the TCP's poor performance. RLP layers typically incorporate Acknowledgement Request (ARQ) methods which confirm the receipt of frames sent from one peer entity to the other. If the ARQ method determines that a frame has not been received or received in error, it calls for the retransmission of the frame. One such RLP that improves TCP performance significantly is described in TIA/EIA/IS-707, which is incorporated herein by reference. The RLP ARQ scheme described in TIA/EIA/IS-707 (hereinafter "RLP IS-707") is a Negative Acknowledgement (NAK) scheme.

In the RLP ARQ scheme described in TIA/EIA/IS-707, when the RLP layer of either the base or mobile station receives a new error free RLP DATA or IDLE frame that is out-of-order, it sends NAK messages for each RLP frame that was not received. The RLP layer keeps track of frames by maintaining Next Expected New Frame (V(R)) and Next Expected in Sequence Frame (V(N)) counters and comparing them with one another. For example, if the mobile station receives frame 10, the V(R) (Next Expected New Frame) and V(N) (Next Expected in Sequence Frame) would both be 11. If the mobile section then receives frames 13, 14 and 15 from the base station, (V(N)) would still be 11 while (V(R)) would be 16 at the mobile station. The mobile station, would then send to the base station a NAK message for frames 11 and 12 after receiving frame 13. The NAK message is, in essence, a request to the peer entity to retransmit the frame that was not received by the requesting entity, which is the mobile station in the example.

A NAK counter at the RLP layer is started for each frame corresponding to the NAK message (one counter for frame 11 and another for frame 12 in the example). The counter generally counts new DATA or IDLE frames received that did not correspond to the NAK message sent. In the example, both counters would be at 3 after frames 13, 14 and 15 were received, i.e. for every received frame that was not a retransmitted frame 11 and 12. When the counter reaches a predetermined threshold, the RLP layer sends additional NAK messages to the peer entity. In the example, if the threshold was 3, the mobile station would transmit additional multiple NAK messages to the peer entity after receiving frames 12, 13 and 14 from the base station.

In general, i+1 NAK messages are sent to the peer entity for the ith time the counter expires. In the RLP ARQ scheme described in TIA/EIA/IS-707, the maximum value of i is 2 before the frame corresponding to the NAK message (frame 12 in the example) is dropped and considered lost. Thus, in the RLP ARQ scheme described in TIA/EIA/IS-707, the maximum number of attempts to recover a lost frame is limited to 3. These additional attempts are referred to as re-trial attempts in this disclosure.

For each received NAK message, the transmitter retransmits the RLP frame requested in the NAK message. Thus, during the second or third re-trial attempt, a transmitter may have already received more than one NAK message for the same frame. This can result in multiple copies of the frame being transmitted back to the requesting entity, which is the mobile station in the example. If one of the retransmitted frames is received correctly by the requesting entity, copies of additional retransmitted frames received afterwards will be ignored by the requesting entity. These redundant transmissions are referred to as extra retransmissions in this disclosure. Retransmissions that were necessary, such as the first retransmitted frame that was received by the requesting entity, are referred to as required retransmissions in this disclosure. The sum total of extra retransmissions and required retransmissions are referred to as total retransmissions in this disclosure.

Extra retransmissions affect a Code Division Multiple Access (CDMA) system in several ways. For example the extra retransmissions reduce TCP throughput. Typically, in an ARQ scheme, before a transmitter will transmit new frames, it will retransmit a frame that did not reach the receiver upon initial transmission and that is requested in a NAK message. Consequently, the retransmitted frames block the yet to be transmitted new frames. Because retransmitted frames that are extra retransmissions are ignored by the receiver, the extra retransmissions do not contribute to information transfer and waste channel bandwidth. The aforementioned blocking effect also takes place at the RLP layer of the ARQ scheme described in TIA/EIA/IS-707. (The RLP layer described in the TIA/EIA/IS-707 document will hereinafter be referred to as "IS-707 RLP").

The channel bandwidth waste effect is exaggerated in transmitters having high source activity. The rate at which an upper layer, such as the TCP layer, sends data to the RLP layer is referred to as source activity in this document. Source activity is affected by the window size of the upper layer. A larger window size allows the upper layer to send more bytes of data to the RLP layer without waiting for an acknowledgment message from a peer entity. Thus, the larger the window size of the upper layer, the more data the upper layer can send to the RLP layer, and the higher the source activity is.

During times of high source activity, the RLP layer receives a substantially constant flow of data from the upper layer and thus has a constant flow of data ready to be sent to lower layers for transmission to the peer entity. When the RLP layer must also send extra retransmissions (unnecessary retransmissions), transmission of the constant flow of data from the upper layer is delayed because the extra retransmissions must be transmitted first. This delays transmission and wastes channel bandwidth. Thus transmission delay results at both the TCP and the RLP layers.

In CDMA systems, extra retransmissions also cause greater interference to other CDMA system users. In a CDMA system, the channel bandwidth is shared by all users in the same frequency band. Thus, when an extra retransmission is made, a transmitter unnecessarily uses the channel bandwidth and unnecessarily interferes with the bandwidth use of others. This causes an increase in the Frame Error Rate (FER) and an increase in power requirements, which in turn, causes lower throughput. The described problems are evident not only in the TIA/EIA/IS-707 environments, but also in other environments incorporating ARQ, and in particular, NAK schemes.

Accordingly, there still exists a need for a method, and for mobile stations and base stations that are not encumbered by one or more of the shortcomings described above. The spirit and scope of the present invention covers such a method, and mobile station and base station.

BRIEF SUMMARY OF THE INVENTION

The invention reduces the extra retransmissions and hence the total number of retransmissions. Pursuant to one aspect of the invention, an adaptive approach is used which detects source activity at either the requesting or responding entity. If the source activity is low, multiple NAK messages can be transmitted, and if the source activity is high, less NAK messages can be transmitted. As described earlier, for each received NAK message, the responding entity retransmits the frame requested in the received NAK message.

If the source activity is low, multiple NAK messages can be transmitted because multiple retransmissions of the requested frame will typically not block the new frames. When the source activity is high, less than the number of multiple NAK messages (for example, one NAK message) is transmitted, thereby avoiding the blockage of new, yet to be transmitted data frames unnecessarily caused by multiple copies of the frame requested in the NAK message in the retransmission queue.

When an RLP entity (responding entity) does not have data to send, it transmits RLP IDLE frames. Thus, pursuant to another aspect of the invention, when the peer RLP entity (requesting entity) receives IDLE frames, it can determine that the other peer RLP entity (responding entity) does not have any data to send. Thus, the requesting entity can make use of this duration of time for retransmissions by sending multiple NAKs. If, on the other hand, the requesting entity receives new DATA frames, it can determine that the peer responding entity has new, yet to be transmitted DATA frames waiting in the queue. In such a case, it would send only less NAK messages (for example, one NAK message), and thereby avoid the unnecessary blockage of new, yet to be transmitted data frames.

Pursuant to another aspect of the invention, the invention can be incorporated at only one entity, for example the requesting entity (which can be the mobile station), without changing the other entity, for example the responding entity (which can be the base station).

DETAILED DESCRIPTION OF THE INVENTION

While the invention covers many variations and embodiments, there is shown in the drawings and will be described in this disclosure illustrative methods and embodiments with the understanding that the illustrative method(s) and embodiment(s) are to be considered only one example of the invention, and are not intended to limit the invention to the illustrative method(s) and embodiment(s) shown.

The invention relates generally to mobile and base stations for wireless networks and, in particular, to mobile and base stations that run TCP/IP applications on wireless networks. The invention also relates to an improved ARQ method, and in particular, an improved method of exchanging NAK messages. In addition, this invention relates to mobile stations and/or base stations configured to perform the improved ARQ method of exchanging NAK messages in CDMA network environments. However, those skilled in the art will recognize that the invention is not limited to mobile stations and/or base stations in a CDMA environment but is expected to perform well in environments that incorporate any Time Division Multiple Access (TDMA) Scheme such as, IS-130, for example. Attributes of the invention include accelerating data transmission and preserving channel bandwidth. In particular, one aspect of the invention is directed toward reducing extra retransmissions during high source activity.

Figure 1:
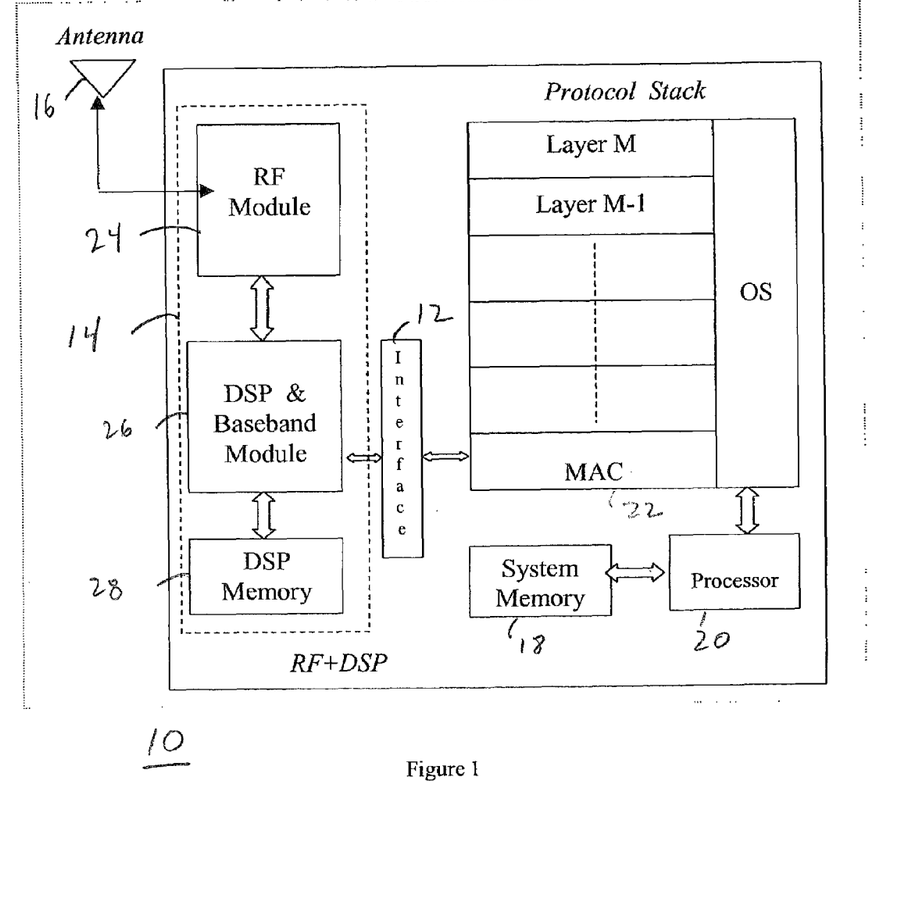
FIG. 1 comprises a schematic diagram of hardware and software components of a mobile station according to one example of the present invention.
Figure 2:
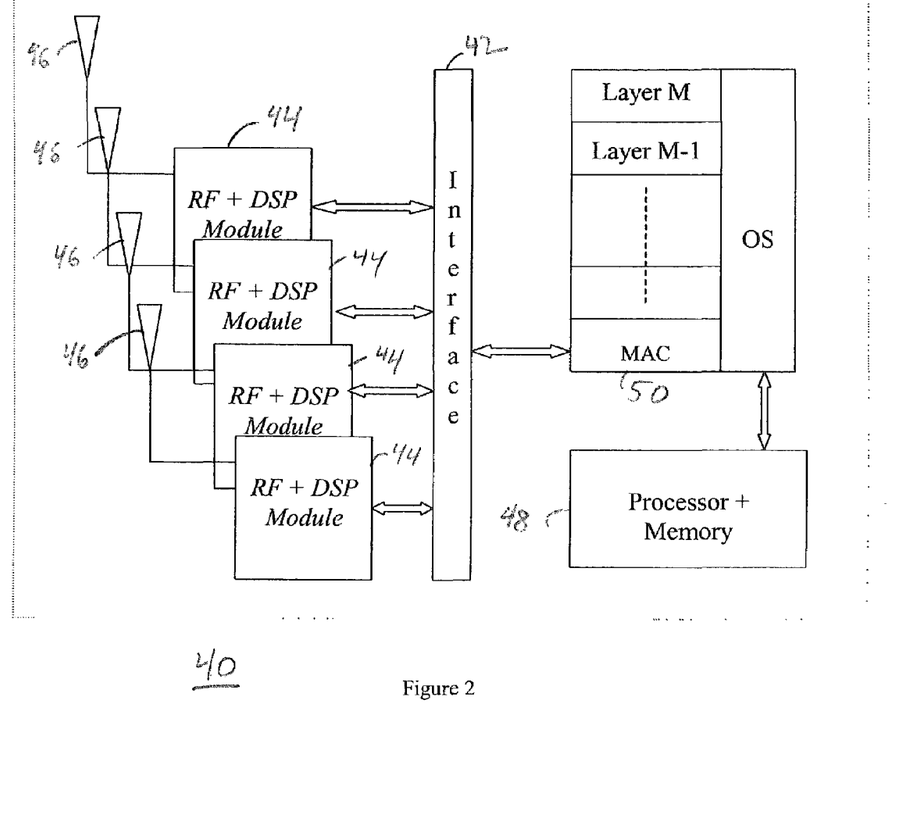
FIG. 2 comprises a block diagram of hardware and software components of a base station according to one example of the present invention.

Schematic diagrams that depict the hardware used in mobile and base stations configured to incorporate aspects of the invention are depicted in FIGS. 1-2, respectively. Those of ordinary skill in the art will recognize, however, that FIGS. 1-2 are not comprehensive of the different mobile and base stations that can be configured to incorporate aspects of the invention and that are within the scope and spirit of the invention.

FIG. 1 depicts a schematic diagram of several different types of mobile stations that have Internet browsing, telemetry, railway control systems and interactive data capabilities such as, for example, wireless or mobile telephones, laptops, mini-computers, such as Palm Pilots, and the like.

In particular, FIG. 1 shows a block diagram which depicts relevant hardware and software components of a mobile station 10 that is configured to incorporate aspects of the invention. An RF Interface 12 and antenna 16 can be used to transmit and receive electromagnetic signals over the air. The mobile station 10 also includes system memory 18, a processor 20, and a protocol stack 22. The RF and DSP module 14 includes a RF module 24, a DSP and baseband module 26, and a DSP memory 28. The DSP (Digital Signal Processor) is typically directed toward signal processing functions, such as channel coding, which are necessary for transmission. In an exemplary method and embodiment described below, the invention may operate within the Operation System (OS) and Processor; the invention may also require storage capabilities which the System Memory can accommodate.

FIG. 2 shows a block diagram which depicts relevant hardware and software components of a base station 40 that may be configured to incorporate aspects of the invention. The base station of FIG. 2 includes an Interface 42 and multiple RF and DSP modules 44, each coupled to an antenna 46. Each RF-DSP-antenna combination is typically used to transmit (and/or receive) signals at a particular frequency. The base station 40 also includes processor and memory 48 and a protocol stack 50.

In a CDMA system, the entire frequency band is shared by all CDMA system users. The users are distinguished based on a unique code. During downlink communications (base station to mobile station), there can be multiple code channels, each of which are identified by a separate frequency and code. Channels used for data transmission are called traffic channels while channels used to control traffic channels are called signaling channels. Each RF-DSP-antenna combination can transmit (and/or receive) signals over traffic or signaling channels. Typically, in the base station of FIG. 2, there is one RF-DSP-antenna combination dedicated for communication with each mobile station active in the base station's service area (cell).

The RF-DSP-antenna combinations shown in the base station of FIG. 2 can be used to transmit and receive electromagnetic signals over the air; the DSP Module (which includes a DSP memory) can be used to perform signal processing functions, such as channel coding, which are necessary for transmission. In the exemplary method and embodiment described below, the invention may operate within the Operation System (OS) and Processor (e.g. the Processor+Memory block of FIGS. 1 and 2); the invention may also require storage capabilities which the Memory (within the Processor and/or Memory block) can accommodate. The Processor+Memory block of the base station of FIG. 2 should typically have sufficient power to accommodate the mobile stations in the base station's service area (cell).

Figure 3:
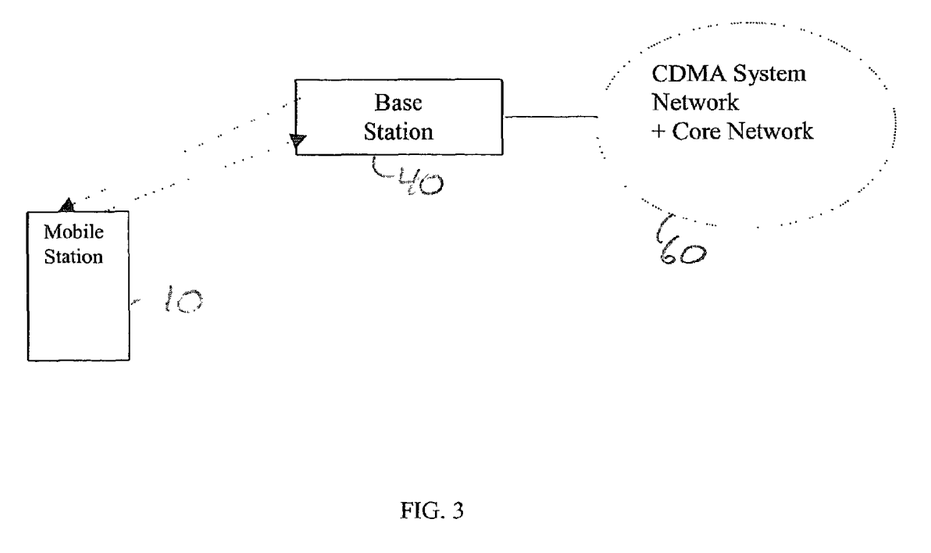
FIG. 3 comprises a block diagram of an example of a system having a mobile station, a base station and a CDMA system network.

FIG. 3 shows one mobile station exchanging signaling data, such as NAK messages, with a base station. The CDMA System Network and Core Network 60 shown in FIG. 3 represent the network side of a CDMA system and the internet-WAN (Wide Area Network), respectively.

Figure 4:
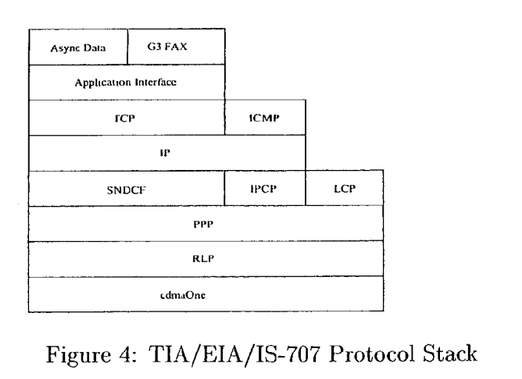
FIG. 4 is a diagram of a TIA/EIA/IS-707 protocol stack.
Figure 5:
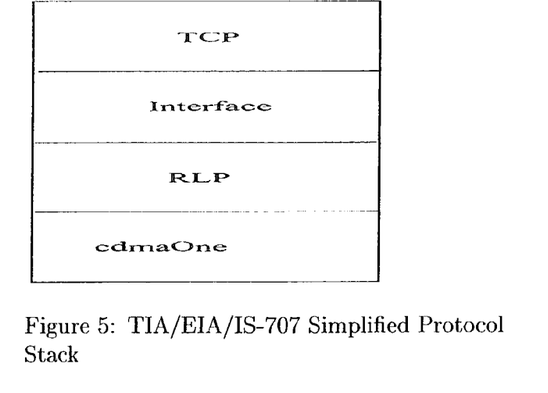
FIG. 5 is a diagram of a TIA/EIA/IS-707 simplified protocol stack.

Those skilled in the art recognize that the invention may be incorporated within many environments, but is described below in a wireless link environment for CDMA systems, and in particular, CDMAOne and CDMA2000 systems. Even more specifically, the invention is described in a TIA/EIA/IS-707 environment. The invention may also be used in a wide area network environment, or a wireless link environment for TDMA systems. The protocol stack of the TIA/EIA/IS-707 environment is shown in FIG. 4, and a simplified protocol stack of the TIA/EIA/IS-707 environment is shown in FIG. 5. The TIA/EIA/IS-707 protocol stack can be implemented in the mobile and base stations of FIGS. 1-2. The protocol stack of FIGS. 4-5 would be implemented at the "protocol stack" portions of the mobile and base stations depicted in FIGS. 1-2.

As described above, in NAK schemes in general, and, in particular, the TIA/EIA/IS-707 ARQ scheme, mobile and base stations exchange NAK messages with one another to request the peer entity to retransmit a frame that was not received earlier by the requesting entity. If the requesting entity, which is the mobile station in this example, after a predetermined time period (which can be measured by the aforementioned NAK counter) has elapsed, still has not received the frame requested in the initial NAK message, additional multiple NAK messages may be transmitted by the requesting entity to the responding entity. The responding entity is the base station in this example. The multiple NAK messages are sent by the requesting entity (mobile station) to ensure that the frame that was not received earlier is retransmitted by the responding entity (base station), and to ensure that the frame is actually received by the requesting entity. The requesting entity is described as the mobile station and the responding entity is described as the base station only for illustrative purposes while explaining one example. Those skilled in the art would recognize that the requesting entity can be the base station and the responding entity may be the mobile station in other scenarios.

As described above, a frame responsive to the initial NAK message may already have been retransmitted by the responding entity and received by the requesting entity. In ARQ schemes in general, and the TIA/EIA/IS-707 ARQ scheme in particular, the responding entity has to send the frames requested in the NAK messages before transmitting any new data frames to the requesting entity because frames requested in NAK messages have a higher priority over new, yet to be transmitted date frames. By retransmitting redundant frames that are responsive to the additional multiple NAK messages, a copy of which may already have been transmitted in response to the initial NAK message, the transmission of new, yet to be transmitted data frames is delayed. The delay is more evident during times of high source activity.

One aspect of the invention is directed to ensuring that the requesting entity receives the frame requested in the NAK message, while also reducing the delay of the transmission of new, yet to be transmitted data frames. Pursuant to the invention, multiple NAK messages can be transmitted to the responding entity during times of low source activity. The multiple NAK messages facilitate the transmittal, by the responding entity, and the reception, by the requesting entity, of unreceived data frames that are requested in the NAK messages. Because multiple NAK messages are sent only during times of low source activity, the delay of new, yet to be transmitted date frames is reduced. In particular, new, yet to be transmitted data frames are typically not ready to be transmitted by the responding entity during times of low source activity. The multiple NAK messages, therefore, will not interfere or delay the transmissions of new, yet to be transmitted data frames as much during times of low source activity.

Pursuant to one aspect of the invention source activity is detected, and, if additional NAK messages need to be transmitted, the number of additional NAK messages to be transmitted by the requesting entity is determined based on the source activity. For example, only one additional NAK message will be sent if high source activity is detected, and multiple additional NAK messages will be sent if low source activity is detected.

In several ARQ methods, the responding entity (the base station in this example) transmits IDLE frames to the requesting entity when the RLP layer of the responding entity does not have new, yet to be transmitted DATA frames or NAK messages to transmit to the requesting entity. As described above, whether new, yet to be transmitted DATA frames are ready for transmission at the RLP layer is typically dictated by, among other factors, the Maximum Window size of an upper layer that sends frames down to the RLP layer. In the TIA/EIA/IS-707 environment, the upper layer is the TCP layer, and the window size of importance is the Maximum TCP Windowsize (hereinafter ("TCP MTW"). Thus, the larger Maximum Windowsize (MTW in the TIA/EIA/IS-707 context), (1) the more new, yet to be transmitted data frames will be ready for transmission, and (2) the less IDLE frames will be transmitted.

Pursuant to a first method of the invention, source activity detection can be performed by observing IDLE frames received at the requesting entity. For example, if the number of IDLE frames received by a requesting entity from a responding entity in a predetermined duration of time is equal to or greater than a predetermined threshold (for example "TH-IDLE"), then the source activity is low. If the number of IDLE frames received by the requesting entity from a responding entity in a predetermined duration of time is less than TH-IDLE, the source activity is high.

The predetermined duration of time can be based on the NAK counter, which resides in the RLP layer. Note that in alternative methods and embodiments of the invention, instead of using one NAK counter, two counters may be used. For example, an IDLE counter that counts received IDLE frames and a DATA counter that counts received DATA frames that do not correspond to the NAK message can be used.

For example, as described above in the BACKGROUND OF THE INVENTION section, the RLP layer determines if additional NAK messages should be transmitted based on a NAK counter that measures the number of received frames that do not correspond to the frame requested in the initial NAK message. If the NAK counter is used as the predetermined duration of time, either multiple NAK messages or less than multiple NAK messages (for example one NAK message) can be transmitted upon expiration of the counter, depending on the detected source activity.

Pursuant to a second method of the invention, source activity detection can be based on the number of consecutive IDLE frames received in a predetermined duration time. For example, the requesting entity can determine that there is low source activity if the number of received consecutive IDLE frames is equal to or greater than a predetermined threshold (for example "TH-IDLE"). If the requesting entity receives less than "TH-IDLE" consecutive IDLE frames, it can determine that there is high source activity.

As described above, the predetermined duration of time can be based on the NAK counter used at the RLP layer to determine whether it is necessary to transmit additional NAK messages, in which case whether additional NAK messages need to be transmitted and the number of additional NAK messages to be transmitted is determined upon expiration of the NAK counter. For example, if upon expiration of the NAK counter, the RLP layer determines that additional NAK messages need to be transmitted, it will transmit multiple additional NAK messages if TH-IDLE or greater than TH-IDLE consecutive IDLE frames are received upon expiration of the NAK counter. If less than TH-IDLE consecutive IDLE frames are received upon expiration of the NAK counter, only one additional NAK message will be transmitted.

Those skilled in the art will recognize that the TH-IDLE value, the number of additional NAK messages sent during times of low source activity, the number of additional NAK messages sent during times of high source activity and the predetermined duration of time can vary depending on system requirements and characteristics. For example, the number of additional NAK messages sent during high or low source activity can be fixed numbers, the number of additional NAK messages can be based on another factor such as the number of retrial attempts. Other variations might involve a predetermined duration of time that is fixed or not based on the NAK counter.

As shown in FIGS. 1, 2, 4 and 5, the TCP layer resides in the operating system of mobile and base stations. The TCP sends data to the RLP layer, which also resides in the operating system. Typically as described above, the TCP Window, which resides in the System Memory, affects the rate at which the TCP layer can send data to the RLP layer (the rate is defined as the source activity in this disclosure). During times of high source activity, the RLP layer receives a substantially continuous flow of data from the TCP layer and typically sends DATA frames to the cdmaOne layer. During times of low source activity, the RLP layer does not have a substantially continuous flow of data from the TCP layer and typically sends IDLE frames to the cdmaOne layer.

Figure 6:
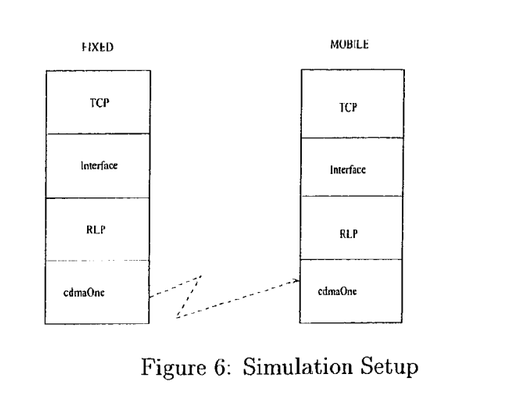
FIG. 6 is a diagram of a simulation setup.

The DATA or IDLE frames are then sent to the RF+DSP module (FIG. 1) in the mobile station, or a dedicated RF-DSP module (FIG. 2) in the base station for scrambling and coding the frame. The frame is then sent by the responding entity to the peer requesting entity via the antenna, as shown in FIGS. 1, 2 and 6.

The requesting entity then receives, descrambles and decodes the frames at the antenna RF+DSP module. The frames are subsequently sent to the cdmaOne layer and next to the RLP layer. The RLP layer of the requesting entity, which also resides in the operating system (OS), as shown in FIGS. 1 and 2, determines whether the received frame is an IDLE or DATA frame based on the leader and frame size. Typically, the RLP layer will use the memory and processor (FIGS. 1-2) to make the determination.

The RLP layer of the requesting entity also determines whether the proper frames were received by comparing the Next Expected New Frame (V(R)), and Next Expected in Sequence Frame (V(N)) counters to one another. The V(R) and V(N) counters can be stored in the memory, and the processor can be used to compare the two counters. Typically, the instructions for such a protocol are stored at the memory and operating system shown in FIGS. 1-2. The RLP layer will then determine whether an initial NAK message needs to be sent.

After receiving the DATA and/or IDLE frames, the RLP layer of the requesting entity will determine whether the responding entity is in a period of high or low source activity based on the first and second methods described above. If a NAK counter has been initiated because a message requested in an initial NAK message has not yet been received, if the predetermined period of time (which can also be the NAK counter) has elapsed, and if the NAK counter has elapsed, the RLP layer of the requesting entity can send an appropriate number of NAK messages to the responding entity based on the first and second methods described above. Typically, the determination as to whether additional NAK messages need to be transmitted and the number of additional NAK messages to be transmitted (if any) is made at the memory and processor block of the requesting entity. The NAK counters are typically stored and run at the memory and/or the processor, i.e. the NAK counters reside in the RLP layer.

The RLP layer of the requesting entity can send the appropriate number of additional NAK messages to the cdmaOne layer, which can send the messages for coding, scrambling and transmittal at the RF-DSP module and antenna, as shown in FIGS. 1, 2 and 6. The responding entity can then receive, decode and descramble the messages in the appropriate antenna, RF+DSP module. The message can be sent to the cdmaOne layer and then to the RLP layer. The responding entity can retransmit a copy of the DATA frame requested in the NAK message in the same fashion the responding entity transmits DATA and/or IDLE frames as described above.

It should be noted that although the invention can be implemented at both the requesting and responding entities, it also performs if incorporated at only the requesting entity (the mobile station in the example described above).

The second method may be considered where TH-IDLE is one, and where the number of additional NAK messages sent during high source activity is dependent on the number of retrial attempts. In this case, $\Gamma i=i$ is the number of additional NAK messages sent during high source activity, where i is the number of retrial attempts and where $\Gamma$ is one.

In this application, results are presented for TH-IDLE=1 and $\Gamma i=i$. A TH-IDLE value of one is implemented because it adds very low processing overhead, and because the complexity of the RLP layer is not increased. The TH-IDLE value, however, can be other values, depending on the environment in which the invention is implemented.

In addition, the invention can be adaptive. During a study, a $\Gamma i$ value equal to the number of additional NAK messages that are sent in the RLP IS-707 was used. This parameter, depending on the network environment, can use values other than i.

Results are shown after incorporating a detailed simulation of the physical layer, the wireless link, and the RLP layer on the Network Simulator simulation tool UCB/LBNL/VINT NS, version 2. Details of the simulation set up and parameters are provided below.

A. Simulation Setup and Assumptions:

The protocol stack described in TIA/EIA/IS-707 is shown in FIG. 4. A simplified protocol stack is shown in FIG. 5. The ICMP, IP, SNDCF, IPCP, LCP and PPP layers shown in FIG. 4 were not simulated because they generate a relatively fixed overhead. This model provides about the same performance as the TIA/EIA/IS-707 model in a steady state. A two node model, as shown in FIG. 6, was assumed during the study.

In the second method, the ARQ mechanisms of the RLP layer, and the channel coding, interleaving and power control of the physical layer determined the effective FER, as seen by the TCP layer. Although WAN effects are ignored, because this document addresses the performance of the TCP on a wireless link, the simulated model is sufficient. A list of simulation parameters considered is provided below.

1. TCP:

Maximum TCP Segment Size (MSS)=512 bytes.

TCP ACK packet size=40 bytes.

Maximum TCP window (Advertised TCP Window)=2 MSS and 4 MSS.

TCP ACKs were treated as data frames by the underlying RLP layer.

Source activity was limited by Maximum TCP Window size (MTW).

2. RLP:

Only RLP primary traffic was considered.

The RLP traffic frames were either Full Rate or IDLE, depending on whether there was data to send or not. (The above two assumptions imply no segmentation at the RLP layer for retransmitted RLP data frames).

There was no connection setup/tearing off so that the connection was always in the steady state.

RLP payload size=20 bytes.

3. Physical layer:

Coding and interleaving were simulated as per the specifications in EIA/TIA/IS95-A.

Closed Loop Power Control was implemented in both directions.

No signaling traffic was considered.

4. Wireless Link:

The simulated link had a propagation delay of 2.5 msec in one direction.

Wireless link bandwidth is 9.6 kbps.

Clarke's fading model was used to simulate flat fading. For simulating a multi path, the output of several delayed and weighted flat fading simulators were multiplied by the signal. The received signal is the sum of such products. The simulated channel model had the same impulse response as the channel model specified in M-1225, guidelines for evaluation of radio transmission technologies for IMT-2000, which is incorporated herein by reference.

B. Results:

Definitions of the parameters used to compare the performance of the new scheme with the IS-707 RLP layer are provided below.

Frame Error Rate (FER): Probability that an RLP frame is received in error.

Extra Retransmissions: Unnecessary retransmissions of an RLP data frame, which are ignored by the receiver.

TCP Bitrate Throughput: Number of useful data bits i.e., without errors and from non-duplicate TCP packets, received per second. (Thus, it also represents link utilization.)

TCP Delay: Time taken for a TCP packet to be received correctly from the time it was initially transmitted.

RLP Delay: Time taken by an RLP data frame to be either received correctly or aborted after the maximum number of allowed retransmissions from the time it was initially sent.

The results obtained from the simulation of the wireless link, the physical layer, the RLP layer and the TCP layer on the Network Simulator are provided below.

The performance parameters considered were the RLP retransmissions, RLP extra retransmissions, the RLP required retransmissions, and the RLP total retransmissions, TCP bit rate throughput, and TCP Delay. There are two sets of results one with the MTW equal to 4 MSS, indicating high source activity at low and moderate FERs, and one with the MTW equal to 2 MSS indicating moderate source activity. Performance curves are shown in FIGS. 7-10.

This subsection addresses the retransmission performance of the TIA/EIA/IS-707 scheme compared to the second method of the invention using the values described above (hereinafter "second method"). The retransmission performance is evaluated on three parameters, viz., extra retransmissions, required retransmissions and total retransmissions (note that the 'x' marks in FIGS. 7-10 show the performance of the second method).

Figure 7:
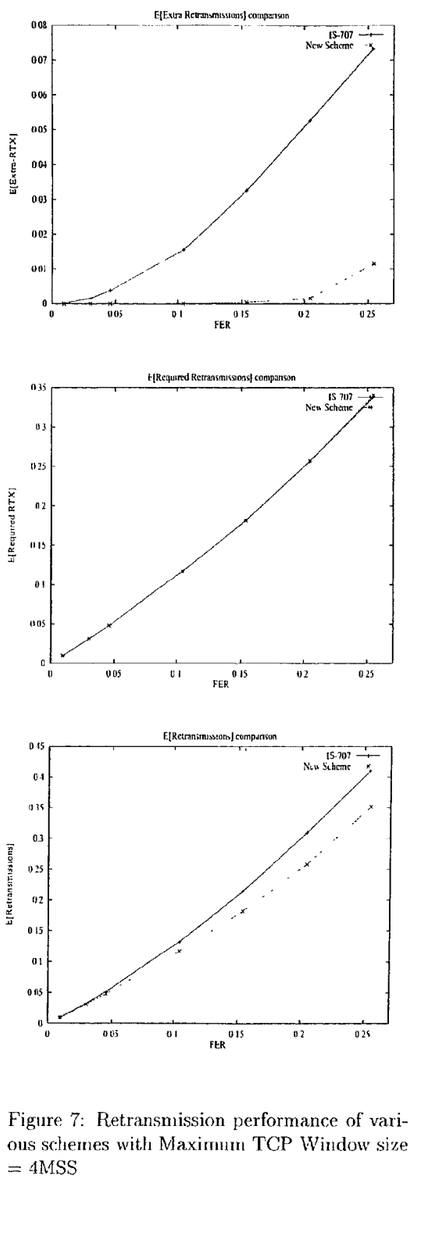
FIG. 7 includes graphs comparing retransmission performance of a known scheme with the present invention.
Figure 8:
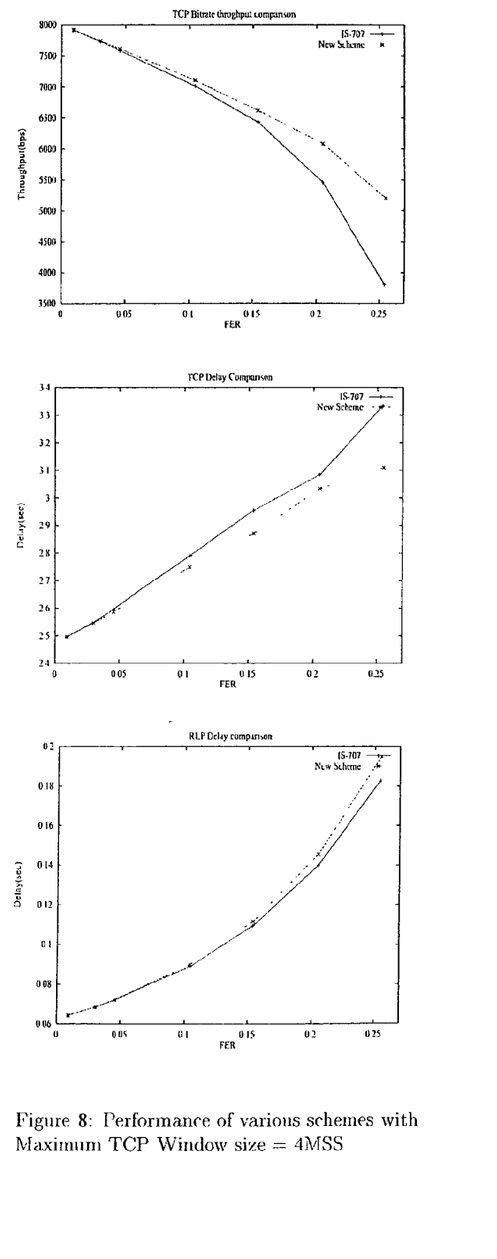
FIG. 8 includes graphs comparing bitrate and delay performance of a known scheme with the present invention.
Figure 9:
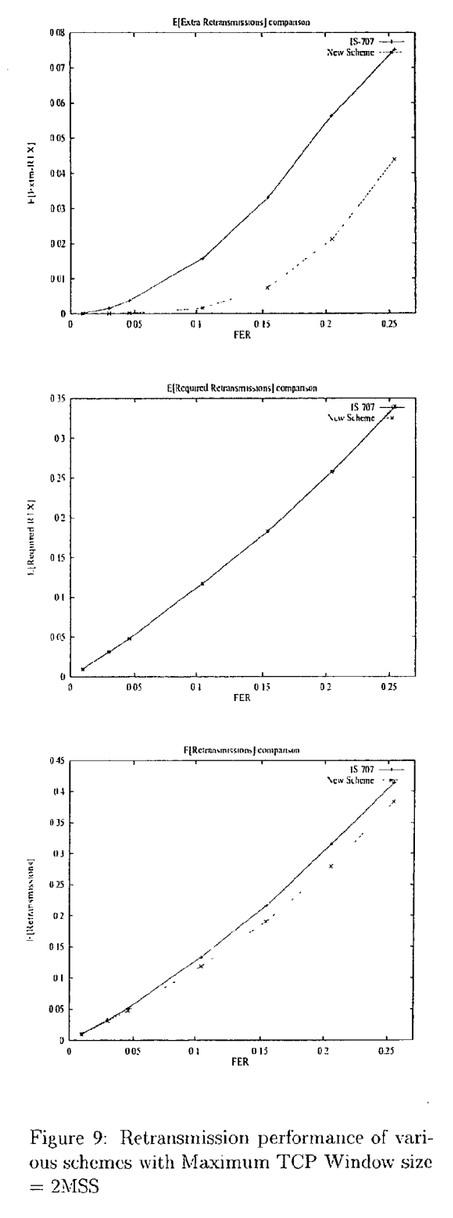
FIG. 9 includes additional graphs comparing retransmission performance of a known schemes with the present invention.

Results for extra retransmissions are shown in FIGS. 7 and 9 at the E[Extra Retransmissions] comparison. The IS-707 RLP performs the same, independent of source activity. The second method performs differently at different levels of source activity because the second method adapts to the source activity. With the TCP MTW equal to 4 MSS, the second method reduces extra retransmissions by more than 50 to 90 percent, when compared against the RLP IS-707 layer performance. In addition, as shown in FIGS. 7-10, there are almost no extra retransmissions until the FER reaches 15 percent. When the TCP MTW is equal to 2 MSS, more extra retransmissions are observed in the second method, but extra retransmissions are still reduced by 30 to 50 percent when compared to the IS-707 RLP layer performance. Thus, the second method reduces extra retransmissions significantly.

A comparison is shown in FIGS. 7 and 9, which show the expected number of required retransmissions per packet. The results show that the second method performs at least as well as the IS-707 RLP. This means that packets that actually require retransmissions for proper reception by the requesting entity are retransmitted intact, thus reducing error probability at the TCP layer.

A comparison is shown in FIGS. 7 and 9, which show that there are a lower number of total retransmissions for the second method than there are for the IS-707 RLP layer. This is because the second method reduces the number of extra retransmissions, but has the same number of required retransmissions as the IS-707. This results in less interference to other users, and hence lowers the FER.

Figure 10:
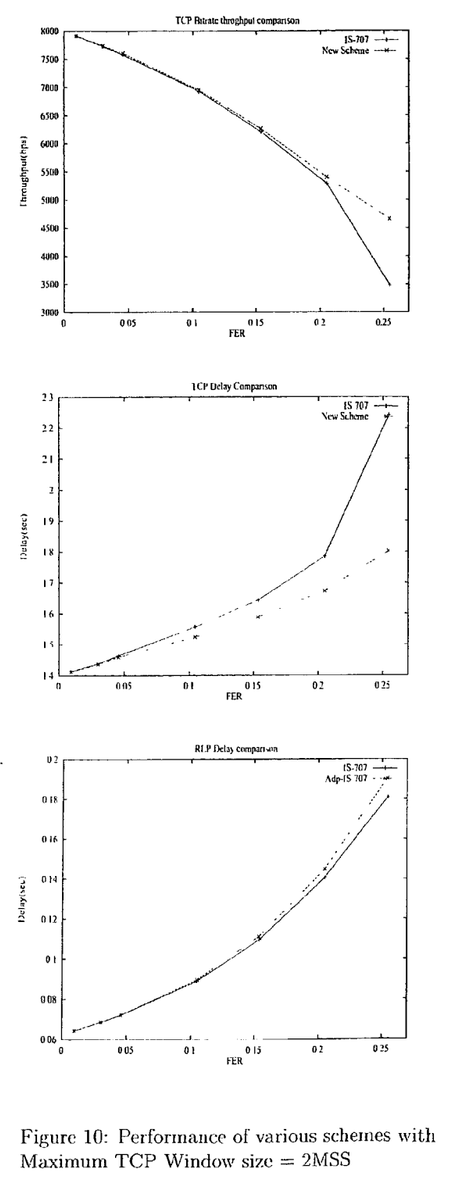
FIG. 10 includes additional graphs comparing bitrate and delay performance of a known scheme with the present invention.

The TCP bitrate throughput performance depends on source activity. TCP Bitrate throughput comparisons are shown in FIGS. 8 and 10, which show the performance of the IS-707 RLP layer and the second method. When the source activity is high (TCP MTW=4 MSS), the second method performs significantly better than the RLP IS-707 layer. At an FER of about 10 percent, throughput increased by 300 bps. At an FER of about 25 percent, the throughput increases by 2 kbps. For moderate source activity (TCP MTW=2 MSS), at an FER of about 10%, throughput increased by 100 bps. At an FER of about 25 percent, the throughput increases by 1 kbps.

The results for TCP Delay are shown in FIG. 8 and FIG. 10 at TCP Delay Comparison. When the TCP generates moderate source activity (MTW=2 MSS), the second method outperforms the IS-707 RLP. For instance, at about a 10 percent FER, the second method reduces delay by 100 msec, and at a 20 percent FER, the difference is about 175 msec, which increases to 500 msec at a 25% FER. Thus, over the entire range of the FER percentages, the second method performs better than the IS-707 RLP layer.

If the source activity is high (TCP MTW=4 MSS), the second method performs better than IS-707 RLP. For example, at about a 10% FER, the second method reduces delay by 130 msec, and at a 20% FER, the difference is about 200 msec, which increases to 300 msec at a 25% FER. Further, during high source activity, over the entire range of FER percentages, the second method outperforms the IS-707 RLP layer.

The results for RLP Delay are shown in FIG. 8 and FIG. 10 at RLP Delay Comparison. RLP Delay values for the second method are slightly longer than those for the IS-707 RLP layer. However, the delay values are nearly identical until a FER of 10 percent, and at about a 25 percent FER, the difference becomes 8-10 msec, which is half the transmission time. Thus, the RLP Delay of the second method is comparable to that of IS-707 RLP layer.

The results presented above show that the second method significantly reduces extra retransmissions (and hence interference to other users), and improves TCP bitrate throughput and TCP delay.

From the foregoing it will be observed that numerous modifications and variations can be effectuated without departing from the true spirit and scope of the invention. It is to be understood that no limitation with respect to the illustrative embodiment(s) and/or method(s) illustrated is intended or should be inferred.

The invention claimed is:

1. A system for transmitting data, comprising
   a) a first station having a first processor configured to format source data into data frames and to generate idle frames, and a first module coupled to the first processor configured to transmit the data frames and idle frames; and
   b) a second station in communication with the first station, the second station having a second module configured to receive the data frames and idle frames and a second processor configured to
      1) detect an absence of an expected data frame,
      2) transmit a negative acknowledgement corresponding to the absent expected data frame,
      3) transmit a plurality of repeat negative acknowledgements if the absent expected data frame is not received,
      4) determine whether a rate of idle frames exceeds a predetermined threshold, and
      5) reduce transmission of repeat negative acknowledgements when the rate of idle frames does not exceed the predetermined threshold.

2. The system of claim 1, wherein the first station is a base station; and the second station is a mobile station.

3. The system of claim 1, wherein the first station is a base station and the first module further comprises a first RF and DSP module coupled to the first processor and a first antenna coupled to the first RF and DSP module; and wherein the second station is a mobile station and the second module further comprises a second RF and DSP module coupled to the second processor and a second antenna coupled to the second RF and DSP module.

4. A system for transmitting data, comprising
   a) a first station having a first processor configured to format source data into data frames and to generate idle frames, and a first module coupled to the first processor configured to transmit the data frames and idle frames; and
   b) a second station in communication with the first station, the second station having a second module configured to receive the data frames and idle frames and a second processor configured to
      1) detect an absence of an expected data frame,
      2) transmit a negative acknowledgement corresponding to the absent expected data frame,
      3) determine from received frames whether source activity exceeds a predetermined threshold,
      4) allow one repeat negative acknowledgement when the source activity exceeds the predetermined threshold, and
      5) allow more than one repeat negative acknowledgement when the source activity does not exceed the predetermined threshold.

5. The system of claim 4, wherein the first station is a base station; and the second station is a mobile station.

6. The system of claim 4, wherein the first station is a base station and the first module further comprises a first RF and DSP module coupled to the first processor and a first antenna coupled to the first RF and DSP module; and wherein the second station is a mobile station and the second module further comprises a second RF and DSP module coupled to the second processor and a second antenna coupled to the second RF and DSP module.

7. The system of claim 4, wherein the second processor is configured to determine whether source activity exceeds a predetermined threshold by determining a rate of idle frames.

* * * * *